United States Patent [19]

Cheo

[11] 4,124,270

[45] Nov. 7, 1978

[54] MONOLITHIC, THREE-DIMENSIONAL INFRARED WAVEGUIDE FOR HIGH POWER LASERS

[75] Inventor: Peter K. Cheo, West Hartford, Conn.

[73] Assignee: United Technologies Corporation, Hartford, Conn.

[21] Appl. No.: 782,857

[22] Filed: Mar. 30, 1977

[51] Int. Cl.[2] .............................................. G02B 5/14
[52] U.S. Cl. .............................. 350/96.12; 350/96.15
[58] Field of Search ............. 350/96 WG, 96 C, 96.11, 350/96.12, 96.15; 331/94.5 H

[56] References Cited

U.S. PATENT DOCUMENTS

| | | | |
|---|---|---|---|
| 3,610,727 | 10/1971 | Ulrich | 350/96 WG |
| 3,806,226 | 4/1974 | Tien | 350/96 WG |
| 3,946,334 | 3/1976 | Yonezu et al. | 331/94.5 H |
| 3,948,583 | 4/1976 | Tien | 331/94.5 H |
| 3,978,426 | 8/1976 | Logan et al. | 331/94.5 H |
| 3,993,963 | 11/1976 | Logan et al. | 331/94.5 H |

OTHER PUBLICATIONS

Cheo et al. "High-Power Infrared Waveguide Modulators" Seventh Semi-Annual Tech, Report (R76-9222-41-3) United Technologies Mar. 30, 1976.
Electronic Design, vol. 17, p.19-20 Aug. 75 "An Advance Reported In Optical Modulators.
Proceedings of the Technical Program at Electro-Optical Systems Design Conf. Sep. 14-16, 1976 Infrared Electrooptic Waveguide" by Cheo.
IEEE Journal of Quantum Electronics, vol QE-13 No. 4 Apr. 77 "Infrared Electrooptic Waveguides" by Cheo.
Cheo et al. "Infrared Waveguide Modulators at Microwave Frequencies" Sixth Semi-Annual Tech. Report (R75-9222414) United Techologies Sep. 30, 1975.

Primary Examiner—John K. Corbin
Assistant Examiner—Stewart Levy
Attorney, Agent, or Firm—Dominic J. Chiantera

[57] ABSTRACT

A plurality of different configuration, monolithic, three-dimensional thin-film infrared waveguide structures having high optical power handling capability, low optical propagating loss, long propagation and interaction length and distortion-free characteristics are disclosed, each having characteristics for use in electrooptic and acousto-optic applications.

18 Claims, 13 Drawing Figures

MONOLITHIC, THREE-DIMENSIONAL INFRARED WAVEGUIDE FOR HIGH POWER LASERS

The Government has rights in this invention pursuant to Contract No. N00014-73-C-0087 awarded by the Office of Naval Research, U.S. Department of the Navy.

CROSS-REFERENCE TO RELATED APPLICATION

The subject matter hereof is also disclosed, and some of it is claimed in the following commonly owned, copending U.S. patent applications entitled BROADBAND MICROWAVE WAVEGUIDE MODULATOR FOR INFRARED LASERS, U.S. Ser. No. 782,866, filed on even date herewith by P. K. Cheo et al., and LARGE AREA MICROSTRUCTURE PROCESSING, U.S. Ser. No. 782,867, filed on even date herewith by R. A. Wagner et al.

BACKGROUND OF THE INVENTION

1. Field of Invention

This invention relates to optical waveguide structures, and more particularly to monolithic, three-dimensional thin-film optical waveguides having a highly uniform thin-film thickness suitable for use with electrooptic and acousto-optic processing of high power infrared (IR) lasers.

2. Description of the Prior Art

The use of infrared (IR) lasers in both electrooptic and acousto-optic applications in applied optical systems such as optical imaging radars, high-data-rate communication systems, and high resolution spectroscopy systems is well known in the art. The desirability of using optical waveguides for generating intelligence derives both from the enormous inherent bandwidth of optical devices, and from the many specialized features of optical waveguides. These optical waveguide devices can be made smaller, cheaper, and more reliable than their conventional counterparts. They are less susceptible to information degradation from electromagnetic interference, vibration, temperature changes, and cross talk; and for specific defense applications, they offer the important advantages of electrical isolation and increased communications security. Such applications require laser signal processing, such as amplitude, frequency and phase modulation to encode intelligence information on the carrier, or deflection and switching of the laser carrier to provide discrete optical control functions. The signal processing of the laser is provided during guided mode propagation of the laser through optical waveguides comprised of a high resistivity, high index of refraction crystal material which is either eptiaxially grown to a desired dimensional thickness, or fabricated through mechanical thinning and polishing of a larger ingot crystal to the desired dimension. Such epitaxially grown, or mechanically fabricated optical waveguides have been provided for use with infrared lasers only at very low optical power levels. For broadband signal processing the laser input power and/or the electrical driving power of the processing signal source must be increased. With increasing power levels, the prior art optical waveguide devices suffer performance degradation from a variety of waveguide imperfections. Some of the imperfections are pervasive to the waveguide material medium itself, such as free carrier absorption, dislocation, and lattice mismatch. Other imperfections are associated with the waveguide fabrication, such as processed induced damage resulting in minute fracture or surface imperfections of the crystal structure, and the lack of thickness uniformity throughout the surface area of the waveguide. Still further imperfections are associated with waveguide design, such as electric power loss at high frequencies resulting from improper electrooptic interface, surface deformation of the waveguide by electrode mounting, and stress-induced birefringence caused by a discontinuity in the index of refraction of the waveguide medium along the boundaries of the electrode resulting in optical distortion.

Epitaxially grown waveguide structures are limited in useful applications since only one major surface of the grown waveguide structure is available for electrode deposition, as shown in the use of epitaxially grown optical waveguides in laser switching and deflection applications as disclosed in U.S. Pat. No. 3,904,270, entitled INTEGRATED OPTICAL SIGNAL PROCESSING SYSTEM, issued to me on Sept. 9, 1975. In addition, the generic substrate material on which the waveguide medium is grown has the same basic crystalline structure and a closely related index of refraction as that of the grown layer, resulting in undesirable leakage of the guided optical wave into the substrate. The mechanically thinned waveguide structures known in the prior art provide very low optical transmission and are limited to very small size and propagation path length due to the prior art methods of fabricating the thin-film waveguides from bulk crystal ingots. The known prior art devices are limited to only the planar configuration due to inadequate thickness control, and thickness uniformity throughout the surface area of the waveguides.

SUMMARY OF THE INVENTION

An object of the present invention is to provide a monolithic, three-dimensional, thin-film infrared waveguide having high optical power handling capability, which is suitable for use with high power lasers in both electrooptic and acousto-optic applications.

According to the present invention, a monolithic, three-dimensional infrared waveguide includes a monolithic, laser medium material structure having a determined length and width and having two mutually opposed, parallel major surfaces, the waveguide further including optical couplers disposed at each end of a first one of the major surfaces to provide optical coupling of a laser beam through a guided laser propagation path extending along a central portion of the longitudinal axis of the waveguide, the monolithic structure having a thickness between the two major surfaces in the region of the guided propagation path which is dependent on the wavelength of the infrared laser, and which is uniform to within one micron per square centimeter, the waveguide further including a metallic base bonded to a second one of the major surfaces for providing dissipation of the laser signal power within the waveguide.

In further accord with the present invention, the waveguide monolithic structure is bi-level including a lower rectangular platform portion having the determined length and width and the two mutually opposed major surfaces, and further including a raised portion projecting from a central region of the first major surface of the platform portion which includes the guided laser propagation path, the raised portion having a uniform thickness in dependence on the wavelength of the laser and the lower platform portion having a uniform thickness less than that of the raised portion and which is dependent on a selected one of a plurality of guided laser propagation modes in the propagation path, the raised portion having a smooth taper at each end of its longitudinal axis to provide a piece-wise linear transition in thickness between the raised portion and the platform portion. In still further accord with the present invention, the raised portion of the bi-level monolithic structure is in the form of a raised ridge extending along the longitudinal axis of the first major surface of the platform portion, and including the guided propagation path, the raised ridge having a width in dependence on a minimum diameter of a focused laser beam. In still further accord with the present invention, a three-dimensional infrared waveguide includes a monolithic structure of determined length and width having two mutually opposed, parallel major surfaces, and including parallel channels formed along the length of, and along the outside width of, a central portion of a first one of said major surfaces, the channels providing in combination a ridge portion extending along the longitudinal axis of the waveguide in the central portion of the first major surface occupied by the channels, the ridge portion including the guided propagation path and having a width in dependence on a minimum diameter of a focused laser beam and having a thickness in dependence on the wavelength of the laser, the thickness being uniform to within one micron per square centimeter throughout the ridge propagation path, the first major surface further including optical couplers disposed on each end portion of the major surface for providing optical coupling of a laser beam through the ridge guided propagation path, the waveguide further including a metallic base bonded to a second one of the major surfaces for providing dissipation of the laser signal power within the waveguide.

The three-dimensional, infrared waveguides of the present invention are suitable for high power infrared laser system applications. A plurality of waveguide configurations include: a bonded down planar thin-film waveguide, a bi-level tapered waveguide, a ridge waveguide, and a raised ridge waveguide, each of which can be used as a basic optical waveguide structure for both passive and active optical signal devices. The waveguide structures are particularly suitable for providing high efficiency electrooptic and acousto-optic modulators, deflectors, and switches. Since the use of the optical waveguides as active devices wherein signal processing of the coupled-through laser is required, electrodes must be added to the surface of the waveguide. The electrodes are known to absorb optical power and to distort the guided wave mode. The three-dimensional waveguides of the present invention overcome the difficulties of optical distortion provided by the electrodes by providing unique, raised interaction regions within the waveguide which provide collimation of the laser within the interaction region, thereby eliminating the confocal limitation on interaction region length. The waveguides provide uniform thickness in both the coupling regions and interaction regions to provide efficient optical coupling and a reduction of optical propagation loss to alleviate laser beam distortion and laser beam alignment problems encountered with conventional planar thin-film waveguides.

Other objects, features and advantages of the present invention will become more apparent in the light of the following detailed description of the preferred embodiments thereof, as illustrated in the accompanying drawing.

DESCRIPTION OF THE PREFERRED EMBODIMENT

Figure 1:
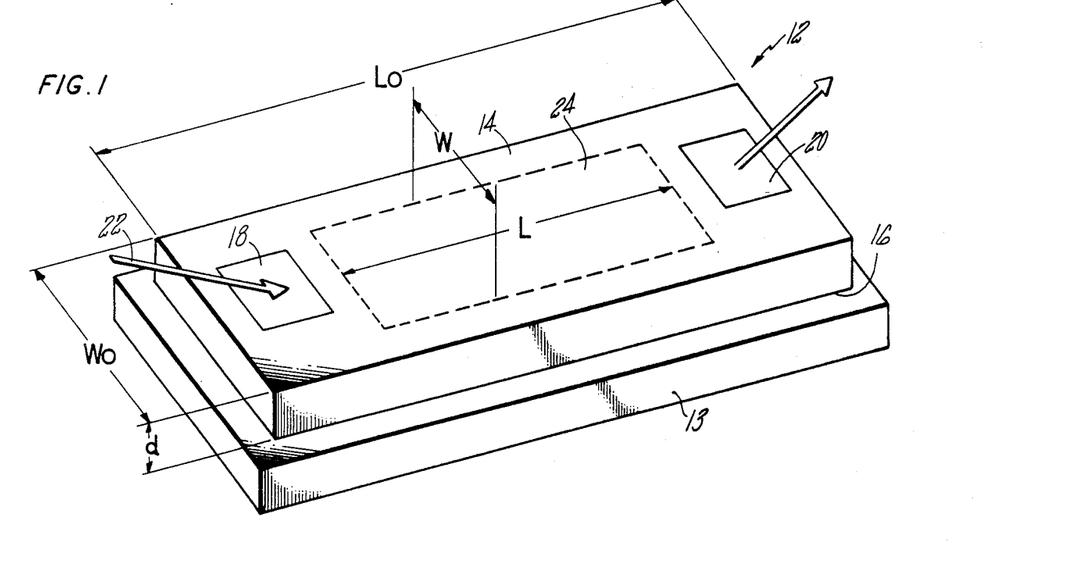
FIG. 1 is a perspective illustration of one embodiment of a planar optical waveguide according to the present invention.

Referring now to FIG. 1, one embodiment of a thin-film optical waveguide according to the present invention, includes a monolithic, planar thin-film structure of a crystal material having high infrared (IR) transmission characteristics, high resistivity, and a high index of refraction profile, such as Gallium Arsenide (GaAs), Cadmium Teluride (CdTe), Zinc Selenide (ZnSe), or any other similar suitable material. The monolithic thin-film is in the form of a large size rectangular slab having a determined width ($W_o$) and length ($L_o$), and a determined thickness ($d$). The waveguide may be bonded through a process, disclosed in the second one of the two hereinbefore cross referenced, copending applications, to a metallic base 13, such as copper which provides conduction of the combined optical and electrical power dissipated within the guide, in addition to providing mechanical support of the structure. The waveguide 12 has two mutually opposed major surfaces, an upper surface 14 and a lower surface 16. The upper surface 14 includes optical coupling regions 18, 20 located at opposite ends of the upper major surface 14, which illustrate the location of the optical couplers used to provide coupling of a laser beam 22 into the waveguide. The optical couplers used may be any one of a number of optical coupling techniques known in the art, such as optical gratings, or prism couplers, however, prism couplers are preferred due to the higher coupling efficiency of the prism coupler which is on the order of ten times that of the grating coupler. This large difference in coupling efficiency provided by the prism coupler results from the lower coupling strength of the grating coupler and the partition of the IR beam energy into multiple diffracted beams when the grating coupler is used, as opposed to a single, substantially homogeneous waveguide beam provided by the prism couplers. The preferred prism couplers may be right angle, germanium prisms of a type known in the art, having prism geometry selected to provide laser excitation of the lower order $TE_0$ and $TE_1$ propagation modes within the waveguide.

An interaction region 24 having a width W and a length L is located in the central portion of the waveguide 12 between the coupling regions 18, 20. The interaction region represents the portion of the waveguide 12 which is common to both the guided laser 22 propagating through the waveguide and the processing signal source, such as the microwave electrodes of the broadband microwave waveguide modulator disclosed in the cross-referenced copending application, or the switching electrodes and interdigital electrodes for electro-optic and acousto-optic processing described in my hereinbefore referenced U.S. Patent.

Figure 2:
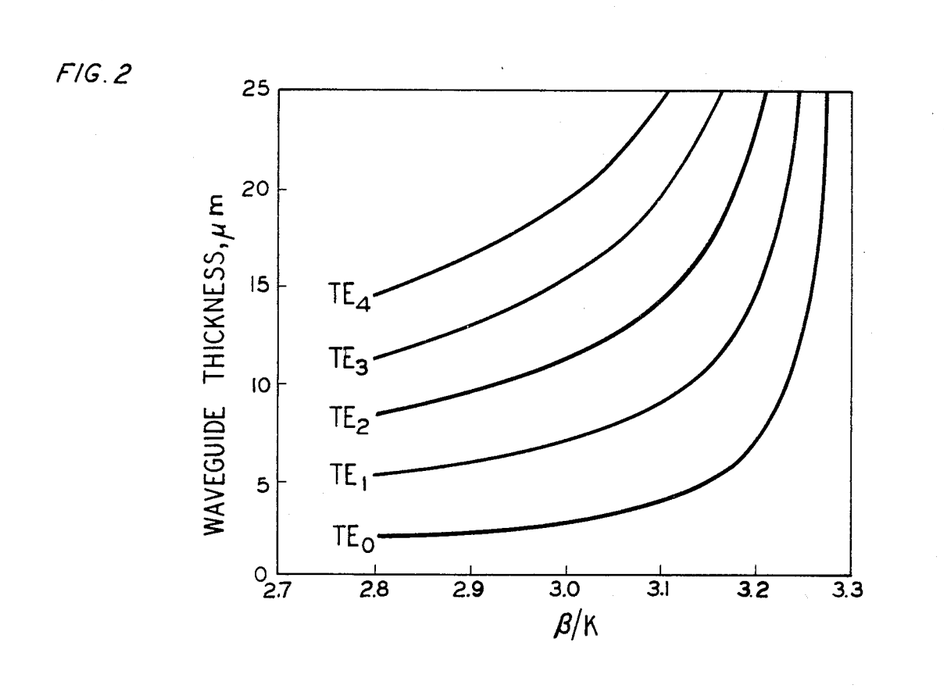
FIG. 2 is an illustration of an operating characteristic of the thin-film optical waveguide of FIG. 1.

The thin-film waveguide thickness (d) in the interaction region is typically on the order of two to three times the wavelength of the operating laser, and for a 10.6 micron, $CO_2$ laser, the typical thickness is on the order of 25 microns. The thickness (d) must be large enough to limit the optical losses in the waveguide which increase with decreasing thickness, and yet be small enough to limit laser beam guided propagation to a single mode operation within the interaction region 24. Thickness uniformity is maintained to within one micron per square centimeter between any portion of the major surfaces 14, 16, and throughout the entire surface area, defined by the width $W_o$ and length $L_o$. The thin film waveguide 12 has a higher refractive index N than its surrounding media. In FIG. 1 the media surrounding the waveguide is air with a refractive index of unity, and the refractive index of the base 13 is $N_b$. The waveguide structure can support a number of discrete TE optical wave propagation modes, each with a corresponding propagation phase constant $\beta$ falling within a range of values: $k < \beta < kN$, where $k = (2\pi/\lambda)$. FIG. 2 is a plot of the waveguide thickness (d) versus the modal index ($\beta/k$) for the various TE modes of a GaAs thin-film waveguide having a refractive index N = 3.275 at the 10.6 micron wavelength of an IR $CO_2$ laser. With the placement of metal electrodes on the surface of the guide the phase constant $\beta$ is not altered to a significant extent, however, the optical attenuation coefficient of the waveguide medium is altered. As described in an article entitled *Optical Waveguide Structures for $CO_2$ Lasers*, by P. K. Cheo et al. Applied Optics, Vol. 12, pg. 500, March 1973, a metal cladded thin-film waveguide at a thickness (d) of 25 microns has an attenuation coefficient of 0.055 cm$^{-1}$ and 0.22 cm$^{-1}$ for the $TE_0$ and $TE_1$ modes respectively. At a thickness $d = 15$ microns, the attenuation coefficients increases to 0.25 cm$^{-1}$ and 1.0 cm$^{-1}$ for both modes. Therefore, use of long waveguide devices with thicknesses (d) much below 25 microns leads to appreciable optical and microwave propagation losses.

Figure 3:
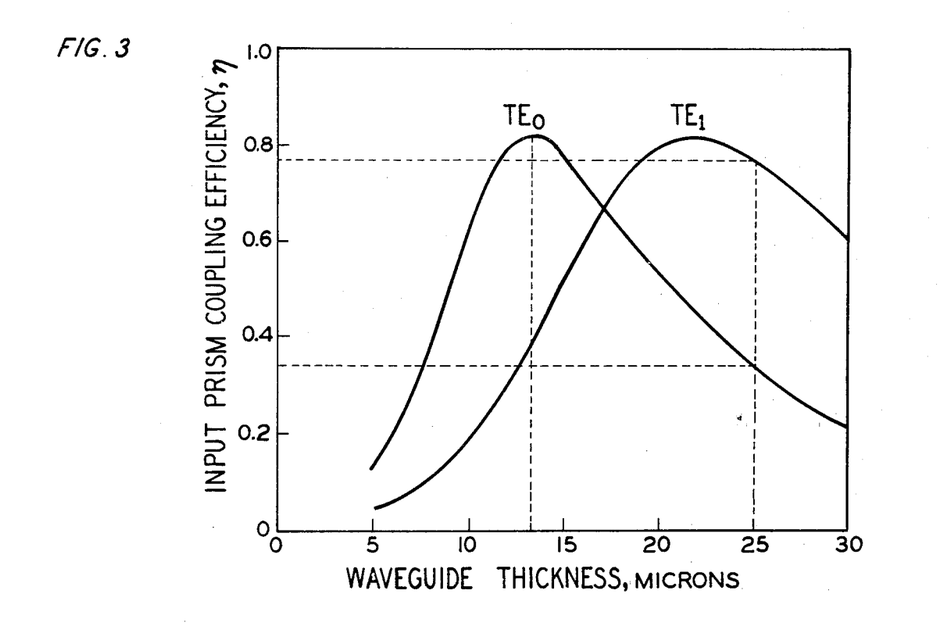
FIG. 3 is an illustration of another operating characteristic of the thin-film optical waveguide of FIG. 1.

The prism coupling of the laser beam into the waveguide 12 depends critically on both phase and aperture matching of the laser beam with the corresponding TE mode. At a phase matched angle, the coupling efficiency $\eta$ for a uniform diameter input beam is given by the expression: $\eta = (2/\alpha l)(1 - e^{\alpha l})^2$, where $l$ is the input beam diameter, and $\alpha$ is the coupling parameter which depends on the waveguide thickness, refractive index, and gap spacing between the prism base and the surface of the waveguide. The coupling efficiency for the $TE_0$ and $TE_1$ modes for a laser beam having a diameter $l = 1$ millimeter, and a gap spacing of 0.1 micron between the prism base and the surface of the waveguide, is shown as a function of the waveguide thickness in FIG. 3. For waveguide thicknesses greater than 20 microns the most efficient coupling is obtained with the $TE_1$ or the higher order modes, whereas efficient coupling of the $TE_0$ modes requires a thickness less than 15 microns. Therefore, the planar waveguide 12 of FIG. 1 having a uniform thickness of 25 microns throughout the waveguide structure provides optical wave propagation in the $TE_1$ mode which has a larger input coupling efficiency than that of the low order $TE_0$ mode by a factor of two. Since the propagation loss of the higher order $TE_1$ mode is higher than that of the lowest order $TE_0$ guided wave mode, it is desirable to provide efficient excitation of the lower order $TE_0$ mode, which, as described hereinbefore, has a much lower optical attenuation coefficient. As shown in FIG. 3, efficient excitation of the $TE_0$ mode requires a waveguide thickness on the order of 12 to 15 microns in the coupling regions 18, 20. It is only at these thicknesses that maximum coupling efficiency for the $TE_0$ mode can be obtained.

Figure 4:
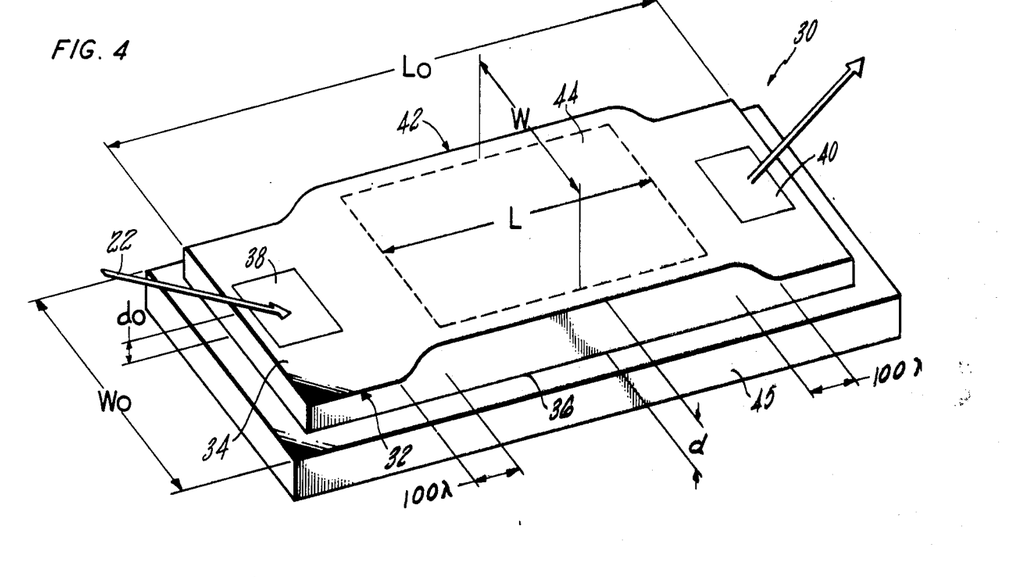
FIG. 4 is a perspective illustration of a three-dimensional infrared waveguide according to the present invention.

Referring now to FIG. 4, a bi-level, tapered, monolithic thin-film waveguide 30 provides a waveguide structure with a desired thickness of 25 microns in the interaction region, while providing a lower thickness value of on the order of 12 to 15 microns in the optical coupling regions. The waveguide 30 is comprised of the same crystal material as that of the planar waveguide 12 of FIG. 1, and includes a generally rectangular lower platform portion 32 having a width $W_o$ and a length $L_o$, and upper and lower major surfaces 34, 36. Optical coupling regions 38, 40 for mounting of the prism or grating couplers are disposed on the surface 34 at opposite ends of the platform portion 32. The lower platform 32 has a determined thickness ($d_o$) between the surfaces 34, 36 which is on the order of 12 to 15 microns, to provide efficient excitation of the lower order $TE_0$ propagation mode for the guided laser radiation. The monolithic waveguide further includes an upper platform portion 42 having a flat surface 44 which defines the height and boundary of the common interaction region of the waveguide, as having a length L and a width W. The upper platform portion 42 includes the interaction region of the waveguide, and has a typical thickness of 25 microns as measured from the flat surface 44 of the platform 42 to the lower major surface 36 of the platform 32. Each end of the upper platform is tapered to provide a smooth and gradual, piece-wise linear transition in thickness between the two portions of the waveguide. The piece-wise linear taper prevents any discontinuities which may cause mode conversion into higher order modes within the raised ridge interaction region, but does not preclude the excitation of the $TE_1$ and higher order modes which may be excited with selection of the proper angle of incidence at the surface of the right angle prism couplers. The taper length is on the order of 100 wavelengths (100 $\lambda$) of the operating laser. As with the planar waveguide 12, the waveguide 30 may be bonded to a metal base 45, such as a copper block to provide heatsinking and increased structural strength to the waveguide.

The bi-level, tapered thin-film waveguide 30 provides enhanced optical transmission efficiency by providing efficient excitation of the lower order $TE_0$ mode to minimize optical propagation losses in the waveguide, while maintaining the desired 25 micron thickness in the common interaction region of the waveguide. Both the planar thin-film waveguide 12 and the bi-level thin-film waveguide 30 provide an interaction region with a width W which is sufficiently large to handle large laser beam diameters. The uniform thickness of the waveguide structure provides a distortion-less transmission of the laser through the waveguide. However, the placement of electrodes on the surface of the waveguide for use as an active signal processing device results in a surface deformation of the waveguide along the edges of the electrodes. This surface deformation results in a stress induced birefringence in the waveguide material along the edges of the electrodes which creates a non-linear change in the index of refraction in that portion of the waveguide. So long as the electrodes are sufficiently wider than the diameter of the beam propagating through interaction region, such that the stress induced birefringence lies at a distance far enough from the propagating channel within the waveguide, no beam distortion will result. Similarly, if the electrodes are placed orthogonal to the beam propagation path, or are sufficiently small in length, the distortion of the beam due to the stress induced birefringence will be minimal. However, there are certain applications, such as the BROADBAND WAVEGUIDE MICROWAVE MODULATOR disclosed and claimed in the hereinbefore cross-referenced, copending application, in which the width of the microstrip electrode must be maintained at a small value (approximately 1 millimeter) to maintain the microwave characteristic impedance at a practical level. Since the narrow width microstrip closely approximates the diameter of the laser, distortion of the beam results. In addition, the use of such a narrow width microstrip electrode causes difficulty in alignment of the coupled-in laser beam with respect to the interaction region of both the planar thin-film, and bi-level, tapered thin-film waveguides. A slight misalignment of the beam with respect to the interaction region causes spreading and deflecting of the beam in the plane of the waveguide and produces significant distortion of the output laser beam shape.

Figure 5:
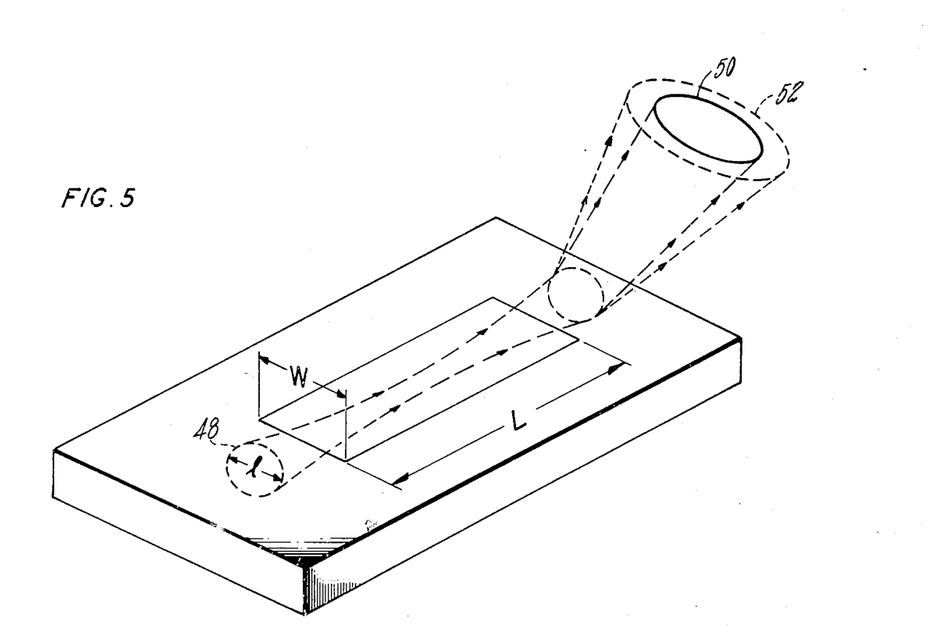
FIG. 5 is a perspective illustration of an operating characteristic of the optical waveguide of FIG. 1.

Referring to FIG. 5, in the absence of an electrode disposed on the surface of the interaction region which has a width W and a length L, an input gaussian shaped laser beam 48 having a beam diameter $l$, approximately equal to the width W, propagates through the interaction region of the waveguide and is coupled out with a beam shape 50 in the far field which is nearly identical to that of the input beam. The transverse shape of the laser beam is essentially confocal through the length of the interaction region as shown. In this case the interaction length is limited in accordance with the confocal condition: $L \leq W^2 (9N\pi/4\lambda)$. If an electrode is placed on the waveguide surface with dimensions equal to the width and length of the interaction region, the output beam is coupled at the same out-coupled angle, but is severely distorted from that of the input beam, as shown by the phantom waveform 52. The distortion is substantially elliptical and becomes nonsymmetrical if the beam is misaligned with respect to the interaction region beneath the electrode. This lens-like effect is caused by surface deformation of the waveguide along the edges of the electrode which produce the localized stress induced birefringence that is typically one order of magnitude larger than the microwave field induced birefringence. The elliptical distortion further increases with applied microwave power as a result of thermal induced birefringence. Since the electrode width cannot be increased to eliminate the beam distortion, a preferred approach is to remove a determined thickness ($d_c$) of the surface waveguide material which borders the edges of the electrode to provide a ridge, interaction region along the guided propagation path. Removal of the waveguide material eliminates the stress induced birefringence while at the same time permits nearly perfect alignment of the laser beam within the desired narrower width of the interaction region by providing collimation of laser within the ridge interaction region, thereby eliminating the confocal limitation on the length of the interaction region. The beam is confined within the ridge interaction region independent of the length L, and the output coupled laser beam shape is not degraded from that of the input beam shape. Such an optical waveguide which provides a ridge interaction region is referred to as a thin-film, simple channel, or ridge waveguide.

Figure 6:
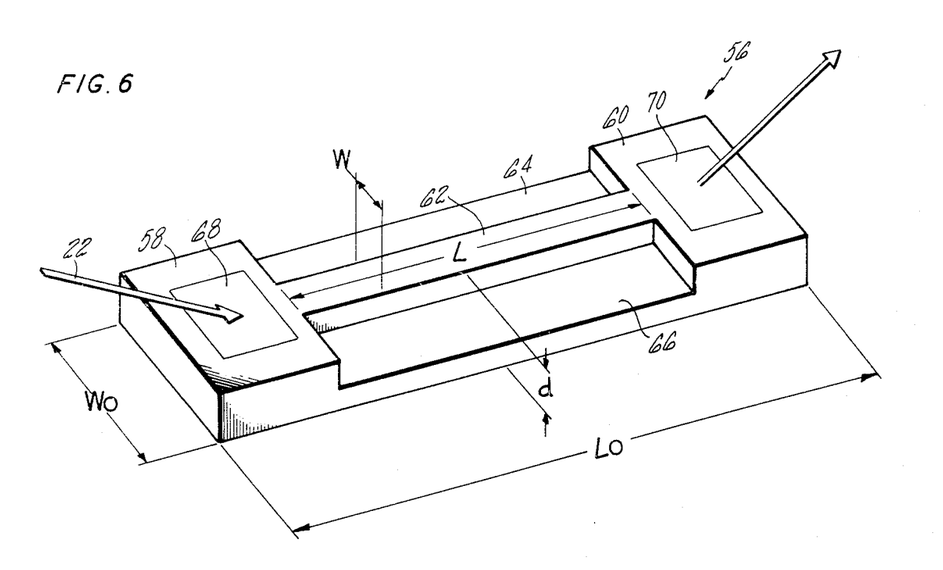
FIG. 6 is a perspective illustration of an alternative embodiment of a three-dimensional infrared waveguide according to the present invention.

Referring now to FIG. 6 a thin-film, ridge optical waveguide 56, comprises a thin-film material identical to that of the waveguides 12, 30 of FIGS. 1, 4 and includes a generally rectangular slab having a width $W_o$ and length $L_o$ essentially equal to that of the waveguides 12, 30. For $CO_2$ laser use, the waveguide 56 includes end portions 58, 60 having a thickness $d$ on the order of 25 microns, which are interconnected along the longitudinal axis of the waveguide by a ridge interaction region 62. The interaction region 62 has the same thickness ($d$) as that of the end portions 58, 60, and having a width W and length L which is not limited by the confocal condition, as described hereinbefore. The edges of the interaction region 62 along the length L are bounded by channels 64, 66. A minimum channel depth ($d_c$) on the order of five microns, measured from the upper surface of the interaction region 62 to the bottom of the channel, is sufficient to provide a confinement of the laser beam within the narrower width W of the interaction region, and along any given length L, as well as to provide elimination of the stress induced birefringence produced by the placement of an electrode of equal width and length on the surface of the interaction region. The end portions 58, 60 include the optical coupling regions 68, 70 from which the laser beam 22 is coupled in and out of the waveguide. The thickness of the interaction region 62 is equal to that of the end portions 58, 60, typically 25 microns. Since the thickness of the waveguide material in the coupling region 68, 70 is equal to 25 microns, the optical couplers provide the highest efficiency coupling of the laser 22 for the higher order $TE_1$ mode, which as described hereinbefore is the higher loss optical mode.

The thin-film, ridge waveguide 56 is preferred for use in such applications as microwave modulation of infrared lasers as described in the cross-referenced, copending application. As such, the waveguide structure has electrodes deposited on both the upper and lower major surfaces of the waveguides as described therein, through integrated optic fabrication techniques described hereinafter in detail. The structure 56 of FIG. 6 does not include a base structure since the waveguide modulator application provides for the mounting of the waveguide together with the electrodes deposited thereon, on a copper block.

Figure 7:
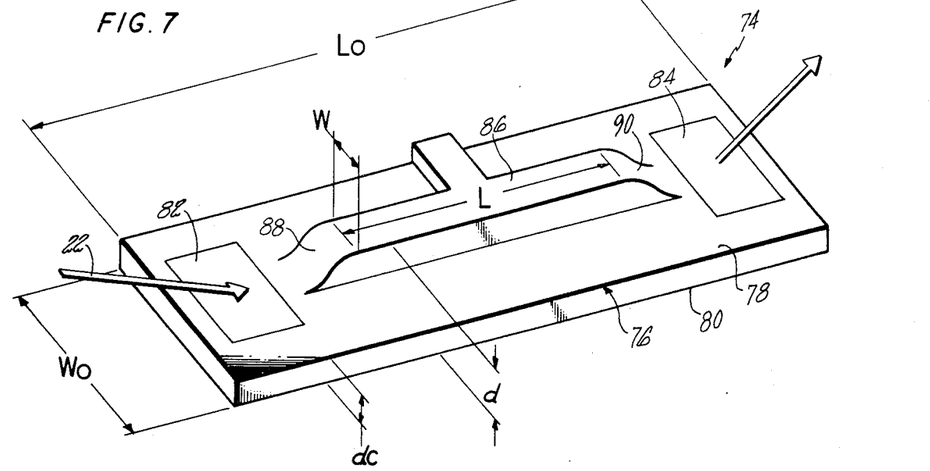
FIG. 7 is a perspective illustration of still another embodiment of a three-dimensional infrared waveguide according to the present invention.

A thin-film optical waveguide which provides the ridge interaction region similar to that provided by the waveguide 56, in addition to providing efficient excitation and propagation of the lower order $TE_0$ mode within the waveguide is illustrated in FIG. 7, where a thin-film, raised ridge waveguide 74 comprises a monolithic structure of crystalline material identical to that of the waveguide described hereinbefore, which has a planar base, or platform portion 76 of generally rectangular shape having a width $W_o$ and length $L_o$. The platform 76 has upper and lower major surfaces 78, 80 and coupling regions 82, 84 located at opposite ends of the platform along its length. A raised ridge portion 86 is disposed along the central longitudinal axis of the waveguide 74 on the upper major surface 78 of the platform 76. The raised ridge 86 includes the interaction region of the waveguide having a width W and length L substantially equal to that of the waveguide 56 of FIG. 6. The raised ridge 86 has tapers 88, 90 on each end of its length L which provide a piece-wise linear transition from a thickness $d$ of the ridge 86 to a thickness $d_c$ equal to 12 to 15 microns for the platform portion 76. As described hereinbefore with respect to the three-dimensional thin-film waveguide 30 of FIG. 4, the narrow thickness of 12 to 15 microns in the optical coupling regions 82, 84 provide efficient excitation of the low order $TE_0$ mode and the piece-wise linear transition provided by the tapers 88, 90 prohibit power conversion into the higher order modes within the raised ridge interaction region 86. Similarly, as described hereinbefore, the higher order $TE_1$ mode may be excited with proper selection of the angle of incidence on the surface of the prism couplers used to couple in the laser 22.

In FIG. 7, the raised ridge 86 is shown in a form of a T configuration similar to that of the raised interaction region 62 of the waveguide 56. The T-shape of the raised ridge 86 is to provide for the accommodation of a T-shape microstrip electrode such as that used in the microwave modulator of the cross-referenced application to provide a standing wave microwave modulator configuration. The features of the raised ridge waveguide 74, including the raised ridge interaction region 86, the thin dimension thickness in the optical coupling regions 82, 84 which overall provide for the highest efficiency guided mode operation, may similarly be modified to accommodate a traveling wave modulator configuration, by adapting the raised ridge 86 to include perpendicular end feed portions as shown in FIG. 7 of the hereinbefore referenced, copending waveguide modulator application. The thin-film raised ridge waveguide 74 provides the most efficient optical waveguide for use with a phase modulator of the type described in the referenced copending modulator application, however, it is the most complex structure to fabricate. As with the waveguides 12, 30, 56 described hereinbefore the uniform thickness is maintained throughout the optical propagation path of the waveguide through a high precision fabrication process described in detail hereinafter.

The planar waveguide 12, and the three-dimensional waveguide 30 find the broadest use in the acousto-optical applications, although certain switching and deflection apparatus use may be applicable as described in my hereinbefore referenced U.S. patent. The simple channel waveguide 56, and the raised ridge waveguide 74 find specific utility in the electro-optical applications, specifically phase modulation of infrared lasers, where narrow electrode widths and long interaction lengths are required to provide high efficiency, broadband modulation of infrared lasers.

The waveguides described hereinbefore comprise thin film crystal material structures of a type known in the art such as $C_r$-doped gallium arsinide, cadmium teluride, zinc selenide, or any other such suitable material having the required properties. The fabrication of the waveguides involves controlled process techniques to ensure high accuracy dimensional control of the waveguide thickness ($d$) across the entire width and length of the optical wave propagating channel within the waveguide crystal structure. A process for fabricating the waveguides to the desired thin film thickness, with a thickness uniformity over the entire surface area of the waveguide on the order of one micron per square centimeter, is described in detail hereinafter. The fabrication process for providing the high uniformity thickness over a large thin film area is directly applicable to fabrication of the thin-film planar waveguide of FIG. 1, however, the process is equally applicable to fabrication of thin film membranes from any one of a number of thin film materials for any application, such as pressure sensing membranes for high accuracy pressure transducers, where precision thickness values and high thickness uniformity is required over a large area. The thin film material may include crystalline, amorphous (glass), semiconductor, and dielectric materials.

Figure 8:
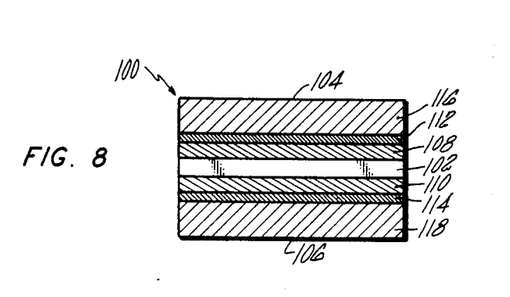
FIG. 8 is a simplified, sectioned side-elevation view of an exemplary material used in the fabrication of the optical waveguides of FIGS. 1, 4, 6 and 7.

In the fabrication of the planar waveguide structures, the initial step is the selection of the desired electro-optic crystal. Generally, the selected crystal is commercially available in large size ingots which are sliced into thin saw cut wafers at the orientation [100] plane, to provide a plurality of rectangular saw cut wafers having a length and width large enough to provide one or more rectangular waveguides and each having a typical saw-cut thickness on the order of 0.015 inches (381 microns). Referring to FIG. 8, a sectioned view of a saw cut wafer 100 along the orientation [100] plane includes the completed process, thin film membrane, or planar waveguide 102 within the center of the wafer. The wafer includes upper and lower major surfaces 104, 106. As described in detail hereinafter, the wafer is bonded to a supporting metal base, such as a copper block, and processed first on one of the major surfaces through the described lapping, polishing, and ion beam milling steps described. The wafer is then processed on the second major surface in a similar manner. The amounts of wafer material removed in the polishing and ion beam milling steps are generally fixed, whereas the amounts of material removed in the more coarse lapping process is determined by the initial thickness of the saw cut wafer, the determined amounts of material removed through ion milling and polishing, and the desired thickness of the final thin film membrane. In FIG. 8, the desired thickness of the final thin film is on the order of 25 microns to provide the planar optical waveguides 12 of FIG. 1. The layers 108, 110 of the saw cut wafer above and below the finished waveguide 102 have a typical thickness of 25 microns which is removed by ion beam milling. The next adjacent layers 112, 114 to the ion milled layers have a typical material thickness of 10 microns which is removed by chemo-mechanical polishing, and the remaining layers 116, 118 is removed by lapping.

The lapping and polishing of the wafer is provided through the use of a commercially available, precision polishing jig of the type developed by G. A. Bennett and R. B. Wilson, described in the article entitled *"Precision Polishing Technique for Optic and Microwave Acoustics"*, Journal of Scientific Instruments, Vol. 43, page 669, 1966. The precision jig includes a hollow, generally cylindrical, outer holder receiving a hardened steel sleeve having a central aperture of determined diameter concentric with the outer holder. A cylindrical holding plate of determined diameter is placed within the central aperture of the steel sleeve and mechanically mounted to the surface of a piston nested within the aperture of the steel sleeve, and movable within the sleeve. Three steel legs having hardened ends are connected to the outer holder. A conditioning ring, or collar, which is a standard option of the jig assembly, is attached to the outer holder. The upper surface of the holding plate may be aligned with the upper surface of the conditioning ring through adjustment of the piston. The saw cut wafer is waxed on one of the major surfaces 104, 106 and placed waxed side down on a flat stainless steel block. The block is then fastened to the holding plate of the polishing jig. The piston position is adjusted until the upper, exposed surface of the saw cut wafer extends above the plane of the upper surface of the conditioning ring by an amount approximately equal to the material thickness to be removed in the lapping process. In this manner the plane of the upper surface of the conditioning ring provides a reference value for the lapping removal step.

During the initial lapping of the saw cut wafer, the parallelism between the two major surfaces 104, 106 of the saw cut wafer is the most crucial, and difficult parameter to control. Exact parallelism is necessary to ensure consistent dimensional thickness throughout the bulk of the crystal. Accurate measurements of the variation in crystal thickness over the surface area of the crystal is provided without physical contact of the wafer through the use of a Hover probe, of a type known in the art, such as the model 155-H manufactured by Ames-Mercer. The Hover probe, which has a noncontacting air gauge head is mounted through a steel shaft to an X-Y table having an angular tilt adjustment. The output signal from the noncontacting air gauge is read on an electronic volt mater, of a type known in the art, which has a dimensional scale readout, such as the Ames-Mercer Model 155-3 which provides a three micron full scale reading in 0.05 micron divisions. For the parallelism adjustment the precision polishing jig is suitably mounted on the X-Y table, and the saw cut wafer disposed on the holding plate of the jig is aligned in parallel with the three hardened steel legs of the polishing jig through the use of the Hover probe. The Hover probe is referenced to a zero center scale reading on the surface of the conditioning ring in the vicinity of one of the three hardened steel legs. Subsequently the other two steel leg locations are brought under the Hover probe and the corresponding micrometer head of the X-Y tilt cable is adjusted to provide a corresponding zero reference value at the location. After all three legs are made parallel, the Hover probe is then placed above the surface of the flat steel plate containing the saw cut wafer and mounted to the holding plate of the jig. The steel plate is adjusted through adjustment of the holding plate, which itself has three angular adjustments, until the block surface is parallel to the steel legs and the conditioning plate.

After the parallelism adjustment of the saw cut wafer surface to the surface of the conditioning ring, the precision jig assembly with the wafer mounted thereon is removed from the X-Y table and placed in an eccentric lapping and polishing machine of a type known in the art, such as the model MAZUR 602 manufactured by Geo Scieme Corp.

In the lapping machine, the exposed major surface of the saw cut wafer is initially lapped by using a three micron platelet alumina, which is a "grit" of micronized unfused synthetic aluminum oxide, in which the individual particles have a uniform surface and a distinctive plate-like shape. The platelet alumina, or any other type of grit having a regular shaped surface to prevent scratching or fracture damage of the wafer, is used on a glass plate, fitted within the eccenric type lapping and polishing machine. The eccentric lapping motion prevents wafer damage which may result from use of a grinding wheel. The exposed surface of the saw cut wafer is lapped until the desired amount of surface material is removed. The amount of material lapped is established by the reference surface of the conditioning ring, and the known lapping rate established by the combination of the load on the wafer surface established by the weight of the jig fixture, the RPM of the machine, and the "grit" size, which provides an approximate lapping rate of 0.0002 inches/minute ($\approx$ 5.0 microns/minute).

The exposed surface of the saw cut wafer is then polished in the eccentric lapping machine with a Politex Supreme pad saturated with a solution of 6 ml of 6% sodium hypochlorite in 100 ml of distilled water, to remove approximately 10 microns of the lapped wafer surface. The polishing is necessary to remove the damage to the wafer surface caused by the "grit" compound, which may extend into the wafer to a depth twice that of the grit diameter, and to produce a mirror like finish on the surface. The polishing rate is approximately 0.001 inch/hour ($\approx$ 25 microns/hour).

After lapping and polishing, the saw cut wafer is removed from the stainless steel block. It is then scribed and cleaved into some number of 5.0 cm by 1.0 cm waveguide strips, the number being dependent on the wafer size. Each waveguide strip is attached to a copper block with vacuum grease, such as Apeizon type grease, with the polished major surface exposed. The copper block is mounted on a rotating substrate holder of an ion beam milling machine of the type known in the art, such as the Vecco Microtech System. The rotating holder is thermally connected with thermal grease to a water cooled copper fixture. The wafer is bonded with vacuum grease to the copper block which is mechanically mounted through a layer of thermal grease to the holder. The water cooled fixture maintains the wafer temperature at less than 50° C. to prevent thermal stress and distortion of the wafer due to temperature build up during the ion milling. The substrate holder rotates at a determined RPM and is oriented at a normal angle to the collimated beam of $Ar^+$ ions. The exposed polished major surface of the waveguide strip is ion milled at a current density of 1.0 milliamps/cm$^2$, resulting in a removal rate of 8 microns per hour. The ion milling is continued until approximately 25 microns of crystal material is removed.

At this point, the processing of the first major surface of the saw cut wafer is complete. In the fabrication of a desired thin-film membrane including the planar optical waveguide, 12 of FIG. 1, the semi-processed wafer is removed from the ion beam milling machine and remounted to the stainless steel block, by waxing the processed surface, and attached to the precision jig for processing the other major surface. However, for the fabrication of a planar optical waveguide for use within a broadband microwave waveguide modulator of the type disclosed in the second one of the two hereinbefore cross referenced, copending applications, a ground microwave electrode must be electroplated on the processed surface. In the intermediate electroplating step, the wafer is left in the ion beam milling after ion milling is complete, after which the substrate holder is reoriented to a position in which the ion milled surface is placed in direct view of a water cooled copper target, and a thin layer of copper film, on the order of one micron, is deposited on the ion milled surface. The copper coated waveguide wafer is then removed from the ion milling machine and electroplated in a manner known in the art such as a Sel Rex Cubath I process at a current density of 30 milliamps/cm$^2$, until a copper film having a thickness on the order of 10 microns is deposited on the copper coated surface of the waveguide wafer. The 10 micron copper film provides the ground plane of the waveguide. The waveguide wafer is then bonded through its 10 micron copper coating to an optically polished copper block with a low viscosity resin of a type known in the art, such as Stycast 1217 resin manufactures by Emerson and Cuming Inc. The low viscosity resin allows formation of a thin bonding layer between the copper film and the copper block surface, on the order of two microns thick. The thickness and uniformity of the thin bonding layer is provided with only a few drops of properly prepared resin applied to the ground plane, by subjecting the copper cladded waveguide surface and the optically polished block to a counter-weight system which provides a uniform distributed weight across the interface between the copper grounded electrode and the optically polished block. This completes the intermediate step of planar waveguide required in the microwave modulator of the referenced copending application.

The thinning process on the second major surface of the saw cut wafer requires the wafer, or the combination of the copper cladded waveguide wafer bonded to the copper block in the case of the waveguide modulator fabrication, to be again mounted in the precision polishing jig and parallel aligned with the three steel legs, as described in detail hereinbefore. After alignment, the jig is placed in the lapping machine and the second major surface is lapped to remove the required amount of crystal material, followed by chemo-mechanically polishing the surface to a mirror like finish, the accordance with the lapping and polishing process described hereinbefore.

During the lapping and polishing of the remaining major surface, the thickness of the waveguide crystal is measured at several points along the length of the wafer with an IR Spectrophotometer of the type known in the art, such as the Perkin-Elmer model 621 operated in the reflectance mode. The IR Spectrophotometer measures the thickness variation in the crystal material resulting from wedging of the material as a result of the lapping and polishing process. With the lapping and polishing process described, the wedging is typically found to be less then two microns along a 5.0 cm length of a 0.0055 inch thick waveguide wafer. The IR spectrophotometric measurements may be compared with the Hover probe measurements to determine whether any wedging has occurred in the copper ground plane or the optically polished copper block to which the waveguide is bonded. In general, there is good agreement between the two independent measurements which implies that that ground plane and copper block are essentially wedge free. For a desired planar waveguide thickness of 25 microns, the wafer is lapped to a thickness of approximately 0.0024 inches (61.0 microns), after which the chemo-mechanical polishing process is performed to remove approximately 10 microns of the crystal material, and provide the mirror like finish on the wafer which has a post polishing thickness on the order of 50 microns. As described hereinbefore, a 10 micron layer removal by polishing ensures that all surface damage caused by the "grit" compound is removed. This is necessary prior to ion beam milling, since the ion beam replicates the pre-ion milling surface profile. However, the polishing process causes some rounding in the wafer surface, such that the amount of material removed by polishing must be limited. The 10 micron value has been established as the optimum value.

With the thickness of the waveguide wafer on the order of 50 microns following polishing of the second major surface, the final thinning of the wafer down to a thickness of 25 microns is provided through a final ion beam milling process in the same ion beam milling apparatus described hereinbefore. Since the final ion milling process reduces the wafer down to the desired final thickness of 25 microns, the maintaining of the waveguide wafer temperature at less than 50° C. is even more important than in the ion milling of the first side where the wafer had a greater material thickness, since the difference in thermal expansion between the waveguide wafer and the electroplated copper ground plane may cause cleavage in the wafer. The water cooling fixture described hereinbefore is specially designed for the machine substrate holder to maintain the wafer temperature at less than 50° C. during the entire period of ion bombardment. In the final ion milling process, the current density of the collimated ion beam is on the order of 0.8 ma/cm$^2$ with the rotating substrate holder oriented at an angle of 45°, with respect to the collimated ion beam. Under these conditions, the removal rate is 8 microns per hour and the ion beam thinning is terminated when the crystal wafer thickness is reduced to the final desired thickness. This completes the basic fabrication process of the planar thin film, bonded down infrared waveguide, or of a thin-film membrane in general.

The mechanical thinning process described hereinbefore, including the coarse lapping, and fine polishing and ion beam milling to controlled removal rates and removal values, results in a high accuracy thin-film thickness value. The precise alignment procedure provided with the Hover probe ensures parallelism of the two major surfaces of the thin film membrane to provide a uniform processed wafer thickness to within 1 micron per square centimeter over the entire area of the thin film, which for the waveguide structure in on the order of 1 cm × 5 cm = 5 cm$^2$. The use of the IR Spectrophotometer provides an accurate monitoring of thickness uniformity during the thinning process. The process is suitable for fabrication of thin film membranes for use in any application requiring such thickness accuracy, and thickness uniformity, and the process is not limited to fabrication of the optical waveguides alone.

Figure 9A:
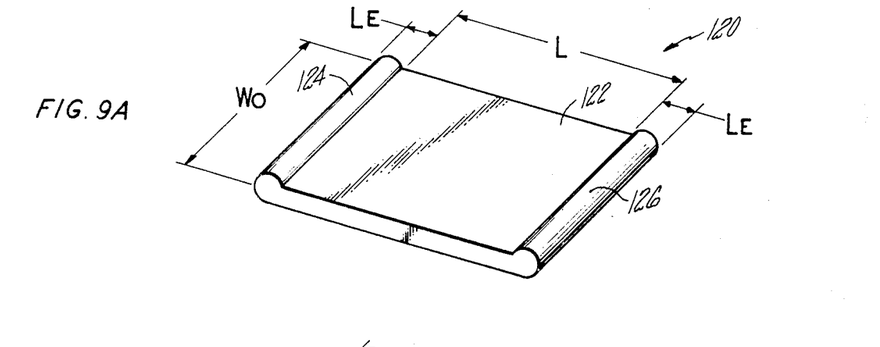
FIG. 9A is a perspective illustration of a mask used in the fabrication of the waveguide structure of FIG. 4.
Figure 9B:
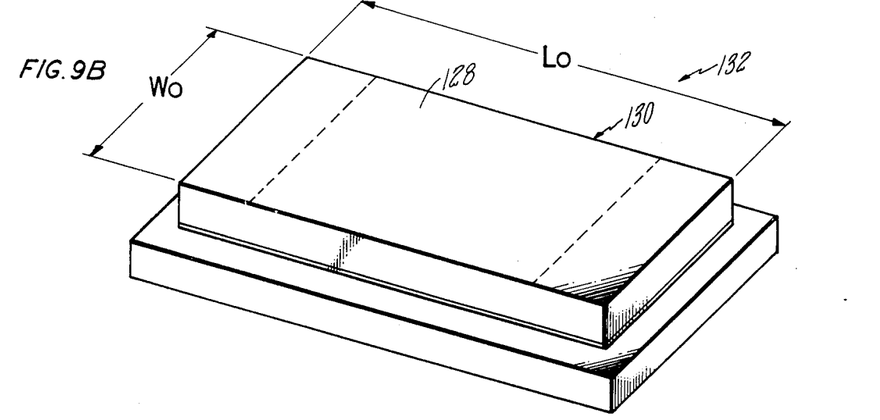
FIG. 9B is a perspective illustration of a planar waveguide structure used in the fabrication of the waveguide of FIG. 4.
Figure 10A:
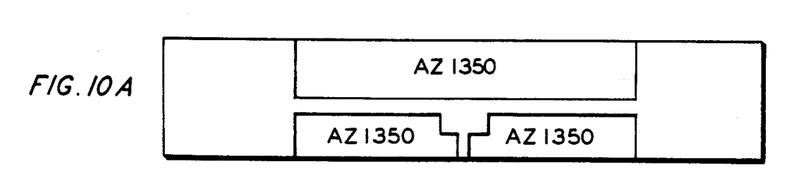
FIG. 10A is an illustration of one step in the fabrication of the optical waveguides of the present invention.
Figure 10B:
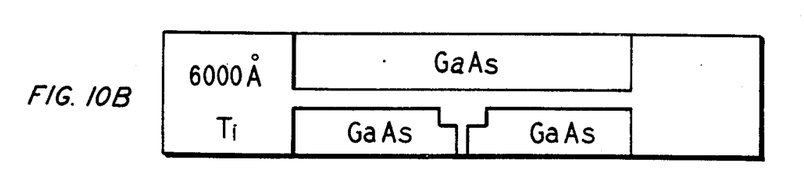
FIG. 10B is an illustration of another step in the fabrication of the optical waveguides of the present invention.

With regard to the fabrication of the various monolithic thin film optical waveguide structures described hereinbefore, other than the planar waveguide, additional processing is required. In the fabrication of the bi-level tapered waveguide structure, described hereinbefore with respect to FIG. 4, which requires a material thickness in the optical coupling region and on the order of 12–14 microns, and a greater thickness in the interaction region determined by the laser wavelength, a completed process planar waveguide wafer is placed in the substrate holder of the ion beam milling machine, and a shadow mask of the type shown in FIG. 9A by the mask 120 is centrally placed on the exposed polished surface of the planar waveguide and held in place by waxing the contact surface. The mask 120 is made of a material having a low ion milling rate, such as aluminum oxide or carbon, and is of a generally rectangular shape having a width $W_o$ equal to that of the waveguide and a length less than that of the waveguide. The mask has a planar central portion 122 having a length L equal to that of the desired length of the interaction region of the waveguide. The mask is flared at the ends 124, 126 into generally cylindrical contours having a determined diameter $L_E$. Referring to FIG. 9B the shadow mask 120 is placed in the central region 128 of the exposed polished surface 130 of the pre-final ion milled planar waveguide 132. For a 10.6 micron wavelength, $CO_2$ laser waveguide having a length ($L_O$) of 5 cm and a width ($W_O$) of 1.0 cm, the length and width of the shadow mask 120 is 2.77 cm and 0.8 cm respectively. With the shadow mask in place on the surface of the waveguide the exposed waveguide surface is ion milled at a current density of 0.6 ma/cm$^2$ with an ion beam angle of incidence normal to and a microstrip electrode pattern mask is placed on the copper film. The electrode pattern is exposed and developed, and the microstrip image is electroplated to a thickness of 11 microns in a copper electroplating bath. The remaining resist coating is removed, and the surface is covered with a ferric chloride solution which etches away a one micron layer of copper, resulting in the removal of the thin copper film entirely, leaving a microstrip electrode with a thickness of 10 microns. The ridge is than fabricated by again spin coating the waveguide surface with an AZ 1350 B photoresist coating and exposing and developing the pattern shown in FIG. 10A. The entire waveguide surface is then ion plated with 6,000 angstrons of titanium. The titanium plated photoresist is then lifted off in an acetone bath to expose the waveguide material surface in the proposed channel region, as shown by the pattern in FIG. 10B. The channel is then formed by ion beam milling the exposed waveguide surface with a collimated beam at a current density of 0.8 ma/cm$^2$ for a determined time interval with the ion beam normal to the surface of the waveguide. The time interval is dependent on the ion milling rate and the desired depth of the channel. The titanium coating has a high differential etch rate with respect to the waveguide material (10:1), such that it provides a milling mask which prevents the region of the waveguide surface covered by the titanium from being milled. The surface is ion milled until the determined depth is acehived, which is typically on the order of 4 to 6 microns. After the ion milling is completed, the remaining titanium coating is etched away in a hydroflouric acid bath without degrading the exposed waveguide crystal surface.

Figure 9C:
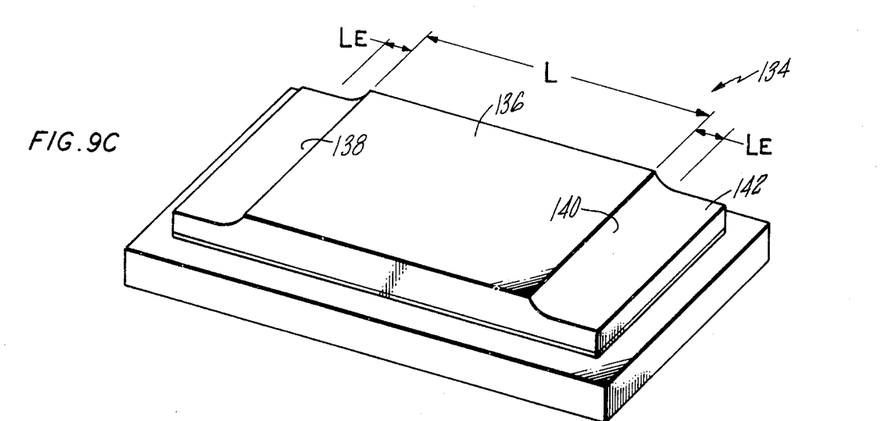
FIG. 9C is another perspective illustration of the waveguide structure of FIG. 4.

The raised ridge waveguide of FIG. 7 is fabricated in a similar manner from a fabricated bi-level tapered waveguide the surface of the waveguide. The ion milling rate is 6 microns per hour, and the waveguide surface is milled until approximately 12 microns of material are removed from the unmasked surface area. The result in the waveguide geometry shown in FIG. 9C where a bi-level, tapered waveguide 134 is provided with a raised plateau portion 136 which is tapered on each end 138, 140 to provide a piece-wise linear transition between the plateau and the remaining surface portion 142 of the guide. The taper length ($L_E$) is greater than 100 wavelengths of the laser intended for use in the waveguide. As may be obvious, the ion milling with the shadow mask may be shortened or extended to remove any determined amount of surface material, and produce any desired height differential between the plateau portion and the remaining surface portion.

Fabrication of the ridge and raised ridge waveguides described hereinbefore, which are used in phase modulator embodiments such as that described and claimed in the hereinbefore cross-referenced, copending application to a BROAD BAND MICROWAVE WAVEGUIDE MODULATOR FOR INFRARED LASERS, is provided through a further process of electroplating a microstrip electrode on the polished surface of the planar waveguide and tapered waveguide respectively, after final ion beam milling of each.

For fabrication of a ridge waveguide, or simple channel waveguide, a planar waveguide wafer is first spin coated with a photoresist coating, such as Shipley AZ 1350 B photoresist. The photoresist coating is exposed and developed in a center portion of the milled waveguide surface along a length L equal to that of the modulator interaction region. A one micron copper film is ion-plated onto the exposed and developed center portion of the waveguide surface. An overcoat of photoresist is then applied over the one micron copper film which includes the electroplated microstrip electrode disposed in the interaction region by the process described hereinbefore. A reversed photoresist is spin coated on the surface of the bi-level waveguide including the microstrip electrode, through a mask pattern which allows coating only of the surface area to be subjected to ion beam milling. A titanium thin film is then sputtered over the entire surface area of the waveguide. The titanium coating over the photoresist is lifted off from the waveguide in an acetone bath to expose the surface area to be milled, and the waveguide is ion beam milled to a desirable depth. After milling the titanium mask is stripped with hydrofluoric acid.

In the process described hereinbefore, the wafer is scribed and cleaved into a number of rectangular waveguide strips between the polishing and the ion-beam milling of the first surface. However, this step is, obviously, eliminated where a thin membrane is being made in accordance with the teachings of the present invention for purposes other than making of waveguides, which is simply an exemplary use of the process of the invention. Similarly, although the invention has been shown and described with respect to preferred embodiments thereof, it should be understood by those skilled in the art that the foregoing and various other changes, omissions and additions in the form and detail thereof may be made therein without departing from the spirit and the scope of the invention.

Having thus described typical embodiments of my invention, that which I claim as new and desire to secure by Letters Patent is:

1. A thin-film optical waveguide for providing guided mode propagation of an infrared laser, comprising:
   a monolithic, solid material planar structure of determined length and width having two mutually opposed, parallel major surfaces, and including a guided laser propagation path extending along a central portion of the longitudinal axis of the structure between said major surfaces, said monolithic structure having a material thickness in the region of the guided propagation path which is dependent on the wavelength of the infrared laser;
   optical couplers, one each disposed at opposite ends of a first one of said major surfaces for optically coupling the laser beam through said guided laser propagation path; and
   a metallic base, disposed on a second one of said major surfaces for providing dissipation of the laser signal power within said structure.

2. The waveguide according to claim 1, wherein said monolithic structure material thickness in the region of said guided propagation path is uniform to within one micron per square centimeter.

3. The waveguide according to claim 1, wherein said monolithic material comprises a low loss, laser transmitting medium having an index of refraction greater than unity.

4. The waveguide according to claim 1, wherein the material thickness between said major surfaces is from two to three times the wavelength of the laser propagating through said guided propagation path.

5. The waveguide according to claim 1, wherein said metallic base is bonded to the second one of said major surfaces with a thin film of low viscosity resin.

6. A waveguide according to claim 1, wherein said monolithic material structure further includes parallel channels formed along the length of, and along the outside width of, a central region of said first major surface, said channels providing in combination a ridge portion extending along the longitudinal axis of said monolithic structure in the central region of said first major surface, said ridge portion including said guided propagation path, said ridge portion having a width in dependence on a minimum diameter of a focused infrared laser beam.

7. A thin-film optical waveguide for providing guided mode propagation of an infrared laser, comprising:
   a bi-level monolithic structure of a low loss, laser transmitting material having an index of refraction greater than unity, said bi-level structure including a lower platform portion having a determined length and width and having first and second mutually opposed, parallel major surfaces, said structure further including a raised portion projecting from a central region of said first major surface, said raised portion including a guided laser propagation path extending along the longitudinal axis thereof, said raised portion having a principal surface parallel to said first and second major surfaces and spaced from said second major surface at a first dimension defining a uniform material thickness selected dependence on the wavelength of the laser signal, said lower platform portion having a uniform material thickness between said first and second major surfaces which has an absolute value in dependence on a selected one of a plurality of guided laser propagation modes within said guided propagation path and which is less than said first dimension, said raised portion having a smooth taper at each end of its longitudinal axis to provide a piece-wise linear transition in thickness between said raised portion of said platform portion;
   optical couplers, disposed at each end of said first major surface of said lower platform portion, for providing optical coupling of the laser through said guided laser propagation path; and
   a metallic base, bonded to said second major surfaces for providing dissipation of the laser signal power from said monolithic structure.

8. The waveguide according to claim 7, wherein said raised portion and said platform portion each have a thickness uniformity on the order of one micron per square centimeter.

9. The waveguide according to claim 8, wherein said raised portion is in the form of a raised ridge extending along the longitudinal axis of said first major surface, and having a determined width in dependence on a minimum diameter of a focused infrared laser beam.

10. The waveguide according to claim 8, wherein said first dimension is selected at a value in the range of from two to three times the wavelength of the laser propagating through said guided propagation path.

11. A thin-film optical waveguide for providing guided mode propagation of an infrared laser, comprising:
    a monolithic structure of a low-loss, laser transmitting material having an index of refraction greater than unity, said monolithic structure having a determined length and width and having two mutually opposed, parallel major surfaces, said structure having a uniform material thickness between said parallel major surfaces having an absolute value in dependence on the wavelength of the laser, said structure further including parallel channels formed along the length of, and along the outside width of, a central region of a first one of said major surfaces, said channels providing in combination a ridge portion extending along the longitudinal axis of said structure in the central portion of said first major surface occupied by said channels, said ridge portion including said guided propagation path and having a width in dependence on a minumum diameter of a focused laser beam;
    optical couplers, disposed at each end of said first major surface, for providing optical coupling of the laser beam through said guided laser propagation path within said ridge portion; and
    a metallic base, bonded to the second one of said major surfaces, for providing dissipation of the laser signal power within from the waveguide.

12. The waveguide according to claim 11, wherein said structure material thickness between said two major surfaces is uniform to within one micron per square centimeter.

13. A thin-film optical waveguide for providing guided mode propagation of an infrared laser, comprising:
    a monolithic, solid material structure of general rectangular shape having a structure length and width dimension which defines two mutually opposed, parallel major surfaces extending along the longitudinal axis thereof, including a first major surface having a planar contour, and a second major surface having a bi-level contour defined by a principal surface and first and second minor surfaces each at a width dimension equal to that of said structure, said principal surface extending along the central portion of the length of said second major surface and spaced at a first dimension from said first major surface, said first and second minor surfaces extending, one each, along opposite end portions of said second major surface, each spaced from said first major surface at a second dimension less than said first dimension and each connected to said principal surface through a smooth, piece-wise linear taper, the solid material in the region of said structure bounded by said principal surface and the portion of said first major surface parallel therewith defining a guided laser propagation path with a material thickness defined by said first dimension in dependence on the wavelengths of the guided laser, the solid material at each end of said monolithic structure bounded by said first and second minor surfaces and the portion of said first major surface parallel therewith defining optical coupling regions with a material thickness defined by said second dimension;

optical coupling means, disposed, one each, in each of said optical coupling regions for optically coupling the laser through said guided laser propagation path; and heat sink means, disposed on said first major surface for providing dissipation of the laser signal power from said monolithic structure.

14. The waveguide according to claim 13, wherein said first dimension is established at a value in the range of from two to three times the value of the wavelength of the laser coupled through said guided propagation path.

15. The waveguide according to claim 14, wherein said first dimension spacing of said principal surface from said first major surface is uniform along the entire surface area of said principal surface to within one micron per square centimeter.

16. The waveguide according to claim 14, wherein said solid material comprises a low loss, laser transmitting medium having an index or refraction greater than unity.

17. The waveguide according to claim 14, wherein said solid material is a crystal material selected from the group consisting of Gallium Arsenide (GaAs), Cadmium Teluride (CdTe), and Zinc Selenide (ZnSe).

18. The waveguide according to claim 14, wherein said principal surface has a width dimension less than that of said structure width to provide a raised ridge extending along the central portion of the length of said second major surface, said principal surface width being selected in dependence on the beam diameter of the laser coupled through said guided propagation path, said second major surface being spaced from said first major surface at said second dimension along all points of the surface area thereof except that central portion occupied by said principal surface along said raised ridge.

* * * * *

UNITED STATES PATENT AND TRADEMARK OFFICE
CERTIFICATE OF CORRECTION

PATENT NO. : 4,124,270            Page 1 of 2

DATED : November 7, 1978

INVENTOR(S) : Peter K. Cheo

It is certified that error appears in the above-identified patent and that said Letters Patent are hereby corrected as shown below:

Column 1, line 56, "eptiaxially" should be --epitaxially--.

The matter in column 15, lines 32-67, including "and a microstrip electrode pattern...tapered waveguide" should be deleted from column 15 and the matter as shown on the attached sheet and 37 of column 16.

Column 17, line 62, after "selected" insert --in--.

Column 18, line 5, change "of" to --and--.

Column 18, line 53, "within from" should read --from within--.

Column 20, line 13, change "or" to --of--.

Signed and Sealed this

Twenty-second Day of May 1979

[SEAL]

Attest:

RUTH C. MASON
*Attesting Officer*

DONALD W. BANNER
*Commissioner of Patents and Trademarks* and a microstrip electrode pattern mask is placed on the copper film. The electrode pattern is exposed and developed, and the microstrip image is electroplated to a thickness of 11 microns in a copper electroplating bath. The remaining resist coating is removed, and the surface is covered with a ferric chloride solution which etches away a one micron layer of copper, resulting in the removal of the thin copper film entirely, leaving a microstrip electrode with a thickness of 10 microns. The ridge is than fabricated by again spin coating the waveguide surface with an AZ 1350 B photoresist coating and exposing and developing the pattern shown in Fig. 10A. The entire waveguide surface is then ion plated with 6,000 angstrons of titanium. The titanium plated photoresist is then lifted off in an acetone bath to expose the waveguide material surface in the proposed channel region, as shown by the pattern in Fig. 10B. The channel is then formed by ion beam milling the exposed waveguide surface with a collimated beam at a current density of 0.8 ma/cm$^2$ for a determined time interval with the ion beam normal to the surface of the waveguide. The time interval is dependent on the ion milling rate and the desired depth of the channel. The titanium coating has a high differential etch rate with respect to the waveguide material (10:1), such that it provides a milling mask which prevents the region of the waveguide surface covered by the titanium from being milled. The surface is ion milled until the determined depth is acehived, which is typically on the order of 4 to 6 microns. After the ion milling is completed, the remaining titanium coating is etched away in a hydroflouric acid bath without degrading the exposed waveguide crystal surface.

The raised ridge waveguide of Fig. 7 is fabricated in a similar manner from a fabricated bi-level tapered waveguide